(12) United States Patent
Busack et al.

(10) Patent No.: US 8,303,049 B2
(45) Date of Patent: Nov. 6, 2012

(54) METHOD FOR OPERATING A VEHICLE BRAKE SYSTEM

(75) Inventors: Adam Busack, Brighton, MI (US); Eric E. Krueger, Chelsea, MI (US); Kevin S. Kidston, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/722,573

(22) Filed: Mar. 12, 2010

(65) Prior Publication Data

US 2011/0221265 A1 Sep. 15, 2011

(51) Int. Cl.
*B60T 8/64* (2006.01)
*B60T 8/60* (2006.01)
(52) U.S. Cl. .................................. 303/154; 303/151
(58) Field of Classification Search .............. 303/152, 303/141, 154, 163–169, 173–175; 701/72–98
See application file for complete search history.

(56) References Cited

U.S. PATENT DOCUMENTS

| | | | | |
|---|---|---|---|---|
| 6,112,146 A * | 8/2000 | Mueller | ................. | 701/71 |
| 6,435,627 B1 * | 8/2002 | Roll et al. | ................. | 303/173 |
| 6,595,602 B2 * | 7/2003 | Jokic et al. | ................. | 303/147 |
| 6,709,075 B1 * | 3/2004 | Crombez et al. | ................. | 303/152 |
| 7,104,617 B2 * | 9/2006 | Brown | ................. | 303/152 |
| 7,575,287 B2 * | 8/2009 | Matsuura et al. | ................. | 303/152 |
| 7,654,620 B2 * | 2/2010 | Jeon et al. | ................. | 303/152 |

* cited by examiner

*Primary Examiner* — Bradley T King
*Assistant Examiner* — Vishal Sahni
(74) *Attorney, Agent, or Firm* — Lionel D. Anderson; Reising Ethington P.C.

(57) ABSTRACT

A method for operating a vehicle brake system having both frictional and regenerative braking capabilities. According to one embodiment, the method monitors wheel slip at a number of vehicle wheels, evaluates individual wheel slip at a single wheel as well as collective wheel slip involving multiple wheels, compares the wheel slips to one or more speed-based thresholds that are based on vehicle speed, and uses the comparisons to help distinguish between those situations that warrant disengagement of regenerative braking operations and those that do not.

15 Claims, 2 Drawing Sheets

METHOD FOR OPERATING A VEHICLE BRAKE SYSTEM

TECHNICAL FIELD

The present invention generally relates to a vehicle brake system, and more specifically, to a vehicle brake system that is capable of both frictional and regenerative braking operations.

BACKGROUND

Vehicle brake systems that have both frictional and regenerative braking capabilities will sometimes cancel regenerative braking operations when the first sign of potential vehicle instability is sensed. For example, some vehicle brake systems will abruptly cancel regenerative braking operations if the vehicle drives over a small pothole and experiences some temporary and isolated wheel slippage at a single wheel. In this situation, an abrupt and immediate cancellation of the regenerative braking operations may not be warranted or required in order to maintain vehicle stability, and could result in reduced fuel economy, increased wear-and-tear on the frictional braking components, as well as a loss of deceleration while the frictional braking torque builds up to replace the regenerative brake torque that has been cancelled.

SUMMARY

According to one embodiment, there is provided a method for operating a vehicle brake system. The method may comprise the steps of: (a) determining a wheel slip; (b) determining a vehicle speed; (c) comparing the wheel slip to a speed-based threshold that is based on the vehicle speed; and (d) if the wheel slip exceeds the speed-based threshold, then disengaging a regenerative braking operation.

According to another embodiment, there is provided a method for operating a vehicle brake system. The method may comprise the steps of: (a) determining a first wheel slip and a second wheel slip; (b) comparing the first wheel slip to a first threshold and comparing the second wheel slip to a second threshold, and the first threshold is different than the second threshold; and (c) if either the first wheel slip exceeds the first threshold or the second wheel slip exceeds the second threshold, then disengaging a regenerative braking operation.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The method described below evaluates one or more braking conditions and, based on that evaluation, distinguishes between those situations that warrant disengaging regenerative braking operations and those that do not. Disengagement of regenerative braking operations typically reduces the fuel economy of the vehicle, thus, the present method attempts to reduce the number of instances where regenerative braking operations are unnecessarily or prematurely disengaged. According to an exemplary embodiment, the present method monitors wheel slip at a number of vehicle wheels, evaluates individual wheel slip at a single wheel as well as collective wheel slip at two or more wheels, and compares the wheel slip to one or more speed-based thresholds that are based on vehicle speed. These techniques may improve the ability of the present method to distinguish or discriminate between those situations where disengaging regenerative braking operations is proper and those where it is premature or unnecessary.

Although the exemplary method is described herein in the context of a brake-by-wire system, such as an electro-hydraulic braking (EHB) system or an electro-mechanical braking (EMB) system, it should be appreciated that the method may also be used with any number of other braking systems and is not limited to the disclosed embodiment. For example, the present method may be used with other brake-by-wire and non-brake-by-wire systems, regenerative braking systems (e.g., those found in hybrid vehicles, battery electric vehicles, etc.), as well as other brake systems using other types of technologies (e.g., disk brakes, drum brakes or a combination thereof). These are only some of the possibilities, as the present method could be used with other vehicle brake systems and is not limited to use with any one particular kind.

Figure 1:
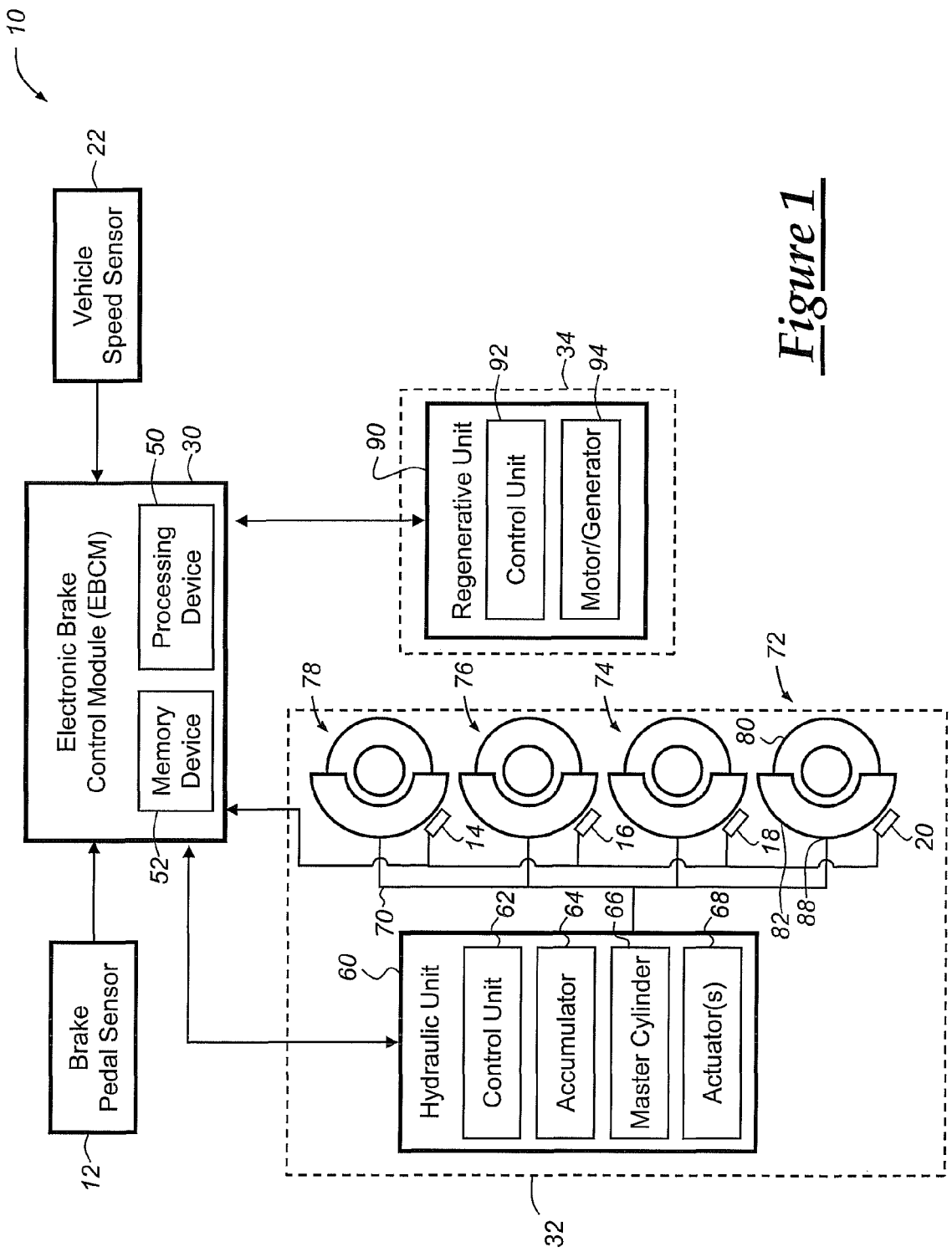
FIG. 1 is a is a block diagram of an exemplary vehicle brake system having both frictional and regenerative braking capabilities.

With reference to FIG. 1, there is shown a block diagram of an exemplary vehicle brake system 10 that has both frictional and regenerative braking capabilities and generally includes a brake pedal sensor 12, wheel speed sensors 14, 16, 18, 20, a vehicle speed sensor 22, an electronic module 30, a frictional braking system 32 and a regenerative braking system 34. Vehicle brake system 10 can be part of a hybrid vehicle or a battery electric vehicle (BEV), for example, that utilizes a combination of frictional and regenerative braking to control the speed of the vehicle and to generate electrical energy. In such an arrangement, frictional braking torque is generated in a conventional manner and counteracts the forward momentum of the vehicle through frictional resistance created by disk brakes, drum brakes, etc. Regenerative braking torque, on the other hand, is created by a generator (e.g., an electric motor operated in a reverse direction) and counteracts the forward momentum of the vehicle through electromagnetically-derived forces that act against the forward rotation of the vehicle wheels and/or other drivetrain components (this process also charges a battery that can later be used to propel the vehicle).

Brake pedal sensor 12 provides vehicle brake system 10 with a brake pedal signal that includes information relating to the position, movement, exerted force, braking intent and/or general state of the brake pedal (hereafter collectively referred to as 'brake status'). Any number of different types of brake pedal sensors may be used; these include non-contact-type sensors (e.g., optical sensors, electro-magnetic sensors, etc.), contact-type sensors (e.g., potentiometers, contact switches, etc.), as well as those that measure the force that the driver exerts against the brake pedal, to name a few. In a brake-by-wire application, brake pedal sensor 12 may be integrated with a brake pedal simulator or emulator that conveys the expected mechanical feel of the brake pedal to the driver. The brake pedal simulator may also include other mechanical and/or electronic components, including sensors, etc.

Wheel speed sensors 14, 16, 18, 20, provide brake system 10 with wheel speed signals that include information relating to the position, speed, acceleration, slippage and/or general state of the wheels (hereafter collectively referred to as 'wheel status'). According to one embodiment, individual speed sensors are coupled to each of the vehicle's four wheels and separately report the rotational velocity of the four wheels. Wheel speed sensors 14, 16, 18, 20, may include electromagnetic elements, optical elements, or any other technology known in the art.

Vehicle speed sensor 22 provides vehicle brake system 10 with a vehicle speed signal that is generally representative of the speed or velocity of the vehicle. A variety of different vehicle speed sensors and sensing techniques may be used, including those that use wheel speed, ground speed, accelerator pedal position, clutch pedal position, gear shifter selection, vehicle acceleration, engine speed, engine torque, and throttle valve position, to name but a few. In one embodiment, vehicle speed sensor 22 derives or calculates a vehicle speed signal from the wheel speed signals described above (in this case, it may be possible to integrate or combine vehicle speed sensor 22 with one or more of the wheel speed sensors 14, 16, 18, 20). In another embodiment, vehicle speed sensor 22 determines the speed of the vehicle relative to ground by directing radar, laser or other signals towards the ground and analyzing the reflected signals. In another embodiment, vehicle speed sensor 22 is coupled to certain parts of the vehicle and determines the vehicle speed accordingly. For example, a vehicle speed sensor can be coupled to an output shaft of the transmission or behind the speedometer or even individual wheel speed sensors 14, 16, 18, 20, as mentioned above. Vehicle speed sensor 22 may include electromagnetic elements, optical elements, or any other technology known in the art. It is also possible for the vehicle speed signal to be provided to vehicle brake system 10 by another component, module and/or system in the vehicle, such as an engine control module (ECM).

Electronic module 30 is an electronic device or unit that is located in the vehicle and includes an electronic processing device 50 and a memory device 52. Electronic processing device 50 may control certain operational aspects of vehicle brake system 10 by executing various electronic instructions, including those of the present method. Some examples of suitable electronic processing devices include digital and analog microprocessors, microcontrollers, application specific integrated circuits (ASICs), or any other processing device known in the art. Memory device 52 could include any type of electronic memory storage means and may be used to store some of the electronic instructions that make up the present method, as well as sensor readings, thresholds, look-up tables, and any other data structure that may hold data used by the method described herein. According to one embodiment, electronic module 30 is an electronic brake control module (EBCM) that controls a combination of frictional and regenerative braking operations. In such an arrangement it may control friction braking system 32 and/or regenerative braking system 34 via command signals sent to these systems. Electronic brake control module (EBCM) 30 may be a separate standalone electronic module or it may be integrated into a larger module or system such as a traction control system, an antilock braking system (ABS), or a vehicle integrated control module (VICM), to name a few possibilities.

It should be appreciated that any of the components described herein—including brake pedal sensor 12, wheel speed sensors 14, 16, 18, 20, vehicle speed sensor 22 and electronic module 30—may include any combination of hardware and/or software components and are not limited to one particular form or embodiment. In addition, these components may be combined, integrated or otherwise included in other components, modules and/or systems located throughout the vehicle and do not have to be separate, discrete components as schematically shown in FIG. 1.

Frictional braking system 32 is shown here as an electro-hydraulic braking (EHB) system, although it may be an electro-mechanical or other type of braking system, that may generate frictional braking torque in a conventional manner. According to this exemplary embodiment, frictional braking system 32 includes a hydraulic unit 60 that is hydraulically coupled to brake units 72, 74, 76, 78 that are located at each of the vehicle wheels or corners. Although hydraulic unit 60 is schematically shown as having a separate hydraulic control unit 62, accumulator 64, master cylinder 66, and one or more actuator(s) 68 co-located with one another, it should be appreciated that any combination of these and/or other devices could instead be provided according to a number of other arrangement known in the art. For example, hydraulic control unit 62 could be integrated within EBCM 30 or some other module and be connected to actuator(s) 68 via electrical connections. Hydraulic control unit 62 may interact with EBCM 30 and act as an intermediary or driver for the various electromechanical actuators and devices in frictional braking system 32. In one example, hydraulic control unit 62 receives brake command signals from EBCM 30, processes those signals, and uses them to operate actuator(s) 68 so that the fluid pressure in hydraulic lines 70 is maintained at a desired pressure. In the case of a disk brake embodiment, the fluid pressure drives brake pistons in brake units 72, 74, 76, 78 and controls their exerted brake force and brake torque. Skilled artisans will appreciate that hydraulic control unit 62 may perform any number of different tasks and execute a variety of different instructions, including those of the present method. Because the general structure and operation of accumulators, master cylinders, actuators and other components of hydraulic unit 60 are generally known, further description has been omitted.

Brake units 72, 74, 76, 78 are each located at a vehicle corner and, according to one embodiment, each includes a rotor 80, caliper 82, brake piston 88, and brake pads (not shown) and may be part of an electro-hydraulic braking (EHB) system or some other type of system. As is appreciated by skilled artisans, a tire-wheel assembly (not shown) is attached to a hub with several lug nuts so that the tire, wheel, hub, and rotor 80 all co-rotate together. Brake caliper 82 straddles rotor 80 and carries brake piston 88 so that a compressive and frictional brake force can be applied by brake linings to opposing sides of the rotor during a braking event. The frictional brake forces slow the rotation of rotor 80 and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. It should be appreciated that the method and system described herein are not limited to use with disk brake systems and could be used with other braking systems and arrangements, including drum brake systems.

Regenerative braking system 34 uses electromagnetically-derived regenerative braking torque to counteract the forward rotation of the vehicle wheels and may include a regenerative unit 90 having a control unit 92 and a motor/generator 94. Regenerative control unit 92 may control or manage certain aspects of the regenerative braking operations, including aspects of the present method, and may interact with EBCM 30, hydraulic control unit 62 and/or some other component, device, module, system, etc. in the vehicle. Motor/generator 94 may be electromagnetically coupled to one or more drivetrain component(s), including output shafts, axles, vehicle wheels, etc., and uses the rotation of the drivetrain component(s) to slow down the vehicle and to generate electrical energy for charging a battery (not shown). While FIG. 1 schematically depicts motor/generator 94 as a single combined device, the motor and generator could be split and provided as two separate devices, or multiple motors/generators could be provided (e.g., separate motors/generators for the front and rear wheels, separate motors/generators for each wheel, separate motors/generators for different functions, etc.), to cite a few possibilities. Thus, the following description only refers to a single combined motor/generator unit 94, even though other regenerative braking system embodiments may be used instead.

Again, it should be appreciated that the preceding descriptions of vehicle brake system 10 and its various components and devices are exemplary and are only provided for purposes of illustration. The method described herein may be used with any number of different vehicle brake systems and is not limited to these exemplary embodiments.

Figure 2:
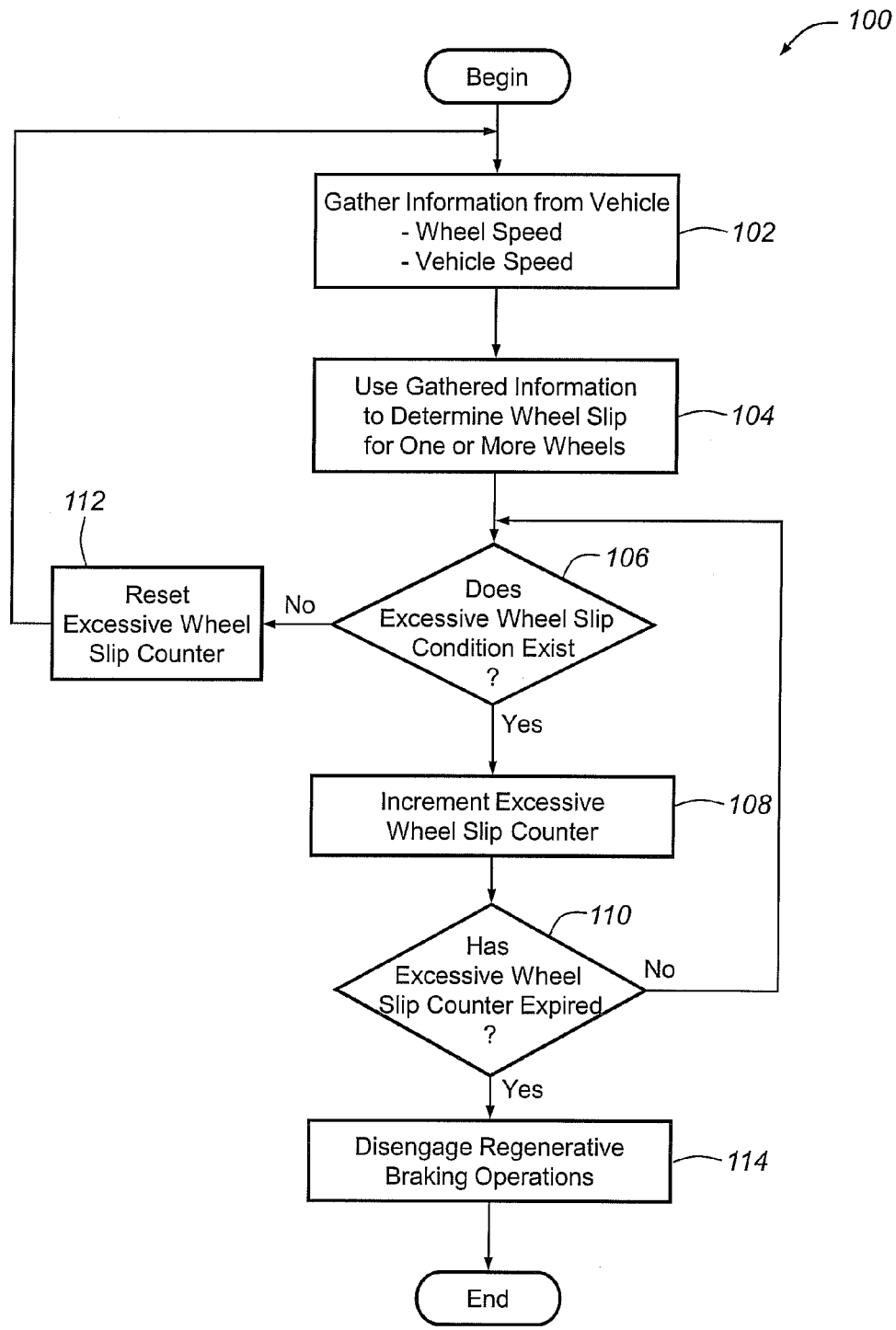
FIG. 2 is a flowchart of an exemplary method that may be used to operate a vehicle brake system, such as the one shown in FIG. 1

Turning now to FIG. 2, there is shown an exemplary method 100 for operating a vehicle brake system and, more particularly, for accurately determining when it is appropriate to disengage a regenerative braking operation due to potential vehicle instability. Beginning with step 102, the method gathers various pieces of information from the vehicle including, but certainly not limited to, wheel speeds, vehicle speed and brake status. In one embodiment, wheel speed sensors 14, 16, 18, 20 provide wheel speed signals, vehicle speed sensor 22 provides a vehicle speed signal, and brake pedal sensor 12 provides a brake status signal which includes driver braking intent (also known as driver requested braking torque). The information gathered in step 102 may be provided by different components, modules and systems than the exemplary sensors shown in FIG. 1 (e.g., wheel speed can be processed and provided by a stability control system or an anti-lock braking system (ABS)); it may be derived or calculated from some other information (e.g., vehicle speed can be representative of the ground speed of the vehicle and can be the result of a complex algorithm based on wheel speed); it may be filtered, converted or otherwise processed before being evaluated for its content (e.g., wheel speed signals may be acquired in the time domain and converted to the frequency domain, or acquired as analog signals and converted to digital signals), etc. It should also be appreciated that wheel speed, vehicle speed and brake status are only some of the potential vehicle operating conditions that could be gathered and used by the present method, as accelerator pedal position, clutch pedal position, gear shifter selection, vehicle acceleration, engine speed, engine torque, throttle valve position, and/or any other suitable vehicle operating condition may be used in lieu of or in addition to the parameters cited here.

Next, step 104 uses the information gathered in the previous step to determine wheel slip for one or more vehicle wheels. Wheel slip can be the result of a number of different factors, including road imperfections (e.g., potholes or non-flush joints in the road), road conditions (e.g., wet road surfaces or road surfaces with loose gravel), and vehicle conditions (e.g., worn out tires), to name a few. In one embodiment, step 104 determines a separate wheel slip value for each vehicle wheel by comparing each wheel speed to a common vehicle speed and looking for discrepancies (the wheel speed rotational velocity may be converted or translated into vehicle ground speed for this comparison or vice-versa). The wheel slip values can assume different forms including speed differences, percentages, ratios, etc. In one embodiment, the Wheel Speed for each wheel ($W_s$) is subtracted from the Vehicle Speed ($V_s$) to determine a Delta Speed ($\Delta_s$) (Equation 1). The Delta Speed ($\Delta_s$) can then be divided by the Vehicle Speed ($V_s$) to arrive at a Delta Speed Percentage ($\Delta_{s\,\%}$%) (Equation 2).

$$\text{Delta Speed } (\Delta_s)=\text{Vehicle Speed } (V_s)-\text{Wheel Speed } (V_w) \quad \text{(Equation 1)}$$

$$\text{Delta Speed Percentage } (\Delta_{s\,\%})=\text{Delta Speed } (\Delta_s)/\text{Vehicle Speed } (V_s) \quad \text{(Equation 2)}$$

"Wheel slip," as used herein, may include Delta Speed values, Delta Speed Percentage values and/or any other values or information—regardless of their form—that relate to wheel slippage at one or more of the vehicle wheels. This information may be calculated by EBCM 30 or it may be provided by some other device, module, system in the vehicle, and this information may pertain to individual wheel slip or collective wheel slip, as explained below in more detail. One reason for determining Delta Speed Percentage is that it takes into account the speed of the vehicle. For example, a Delta Speed ($\Delta_s$) value of 3 m.p.h. may be more of a concern to a vehicle traveling 10 m.p.h. than it is to the same vehicle traveling 70 m.p.h. By the same token, a Delta Speed Percentage ($\Delta_{s\,\%}$) of 10% may be more concerning to the 70 m.p.h. vehicle than it is to the 10 m.p.h. vehicle. Thus, any combination of suitable wheel slip information may be determined by step 104.

Next, step 106 evaluates the wheel slip information from the previous step and determines whether or not an excessive wheel slip condition exists. There are a number of different ways for this determination to be made. According to one possibility, step 106 may compare a wheel slip to a speed-based threshold that is based on vehicle speed. This differs from techniques where wheel slip is compared to a threshold that is not related to vehicle speed. As mentioned above, a Delta Speed ($\Delta_s$) value of 3 m.p.h. may be more of a concern to a vehicle traveling 10 m.p.h. than it is to the same vehicle traveling 70 m.p.h.; thus, a speed-based threshold may take this relationship into account. According to another possibility, step 106 may compare a collective wheel slip to a collective threshold, where the collective wheel slip takes into account the individual wheel slip of two or more wheels. The collective threshold is preferably a collective speed-based threshold, however, this is not necessary. To illustrate the use of collective wheel slip, consider the example where the vehicle drives over a small pothole that is on the left side of the vehicle (typically, this situation does not warrant disengaging the regenerative braking operations). Even though the individual wheel slip at the left front wheel may exceed an individual threshold (suggesting that an excessive wheel slip condition exists), step 106 may look at the collective wheel slip of the two front wheels together (which includes the front right wheel that did not encounter the pothole) and conclude that the collective wheel slip does not exceed a collective threshold and that no excessive wheel slip condition exists. Any number of wheel groups may be used to determine and evaluate collective wheel slip (e.g., wheels attached to the same vehicle axle can be grouped together (front wheels, rear wheels, etc.), wheels attached to the same side of the vehicle can be grouped together (left side wheels, right side wheels, etc.), diagonal or kitty-corner wheels can be grouped together, etc.). By using collective wheel slips/thresholds, in addition to or in lieu of individual wheel slips/thresholds, step 106 may be able to gain a more accurate picture of the overall wheel slip situation confronting the vehicle and thereby make a better decision regarding disengagement of the regenerative braking operations.

Step 106 may conduct its evaluations, calculations, determinations, etc. through the use of look-up tables or other data structures. For example, one or more look-up tables could be used to maintain speed-based thresholds, where vehicle speed is the input and wheel slip threshold is the output. According to an exemplary embodiment, four separate two-dimensional look-up tables are used to maintain various speed-based thresholds: a first look-up table maintains individual wheel slip thresholds for the front wheels (in this case, the front wheels use the same threshold), a second look-up table maintains collective wheel slip thresholds for the front wheels, a third look-up table maintains individual wheel slip thresholds for the rear wheels (in this case, the rear wheels use the same threshold), and a fourth look-up table maintains collective wheel slip thresholds for the rear wheels. It is possible for the front individual and/or collective wheel slip thresholds to be the same, to be different, or for other look-up tables to be provided that contains wheel slip thresholds for other wheel groups (e.g., left wheels, right wheels, drive wheels, etc.). The various thresholds may be empirically derived from testing during development of the vehicle (e.g., static information that generally does not change) or during the operational lifetime of the vehicle (e.g., dynamic information that is updated, modified, changed, etc.), and they may take into account factors such as vehicle speed and conditions including weather conditions (e.g., rain, snow, ice, etc.), powertrain conditions (e.g., front wheel drive, rear wheel drive, all wheel drive), vehicle condition (e.g., weight, load, tire pressure, etc.), and used to populate the various look-up tables.

The wheel slip thresholds may be expressed in terms of Delta Speed Percentage ($\Delta_{s\,\%}$), and may decrease as the speed of the vehicle increases. As previously mentioned, a Delta Speed Percentage ($\Delta_{s\,\%}$) of 10% may be more concerning to a vehicle traveling 70 m.p.h. than to the same vehicle traveling 10 m.p.h. vehicle. Although the present description has been in the context of an exemplary look-up table that includes percentage values, it should be appreciated that step 106 could algorithmically determine or model the wheel slip thresholds, as opposed to obtaining them from look-up tables, and it could use wheel slip thresholds other than percentages. No matter how it is determined, expressed and/or used, the wheel slip thresholds are meant to generally correspond to the maximum amount of wheel slip that the method will tolerate before determining that an excessive wheel slip condition exists.

Step 106 may use any combination of one or more comparisons to determine if an excessive wheel slip event exists. In the example above where four different look-up tables are used, step 106 evaluates front individual wheel slip, front collective wheel slip, rear individual wheel slip, and rear collective wheel slip. If the measured wheel slip exceeds the corresponding threshold for any one of these four look-up tables, then step 106 may determine that an excessive wheel slip condition exists. Consider the example where a vehicle is traveling 10 m.p.h., and the following wheel slips are determined: a front left (FL) individual wheel slip value of 9%, a front right (FR) individual wheel slip value of 8%, a rear left (RL) individual wheel slip value of 11%, and a rear right (RR) individual wheel slip value of 9%. Further assume that, based on a vehicle speed of 10 m.p.h., the speed-based thresholds are as follows: front and rear individual wheel slip thresholds of 12% and front and rear collective wheel slip thresholds of 10%. The parameters of this example are summarized in the following table.

TABLE I

|  | FL (9%) | FR (8%) | RL (11%) | RR (9%) | CF (9, 8%) | CR (11, 9%) | Wheel Slip Outcome |
|---|---|---|---|---|---|---|---|
| Front Individual Wheel Slip Threshold | 12% | 12% |  |  |  |  | False |
| Rear Individual Wheel Slip Threshold |  |  | 12% | 12% |  |  | False |
| Front Collective Wheel Slip Threshold |  |  |  |  | 10% |  | False |
| Rear Collective Wheel Slip Threshold |  |  |  |  |  | 10% | True |

In this particular case, none of the individual wheel slips for the FL, FR, RL and RR exceed their corresponding thresholds (9%<12%, 8%<12%, 11%<12% and 9%<12%), nor does the collective front wheel slip CF exceed its threshold (both 9% and 8% are <10%). However, the collective rear wheel slip CR exceeds its threshold because one of the two individual wheel slips—in this case, the individual rear slip RL (11%)—is higher than the collective rear threshold (10%). In order for the collective wheel slip to stay below its collective threshold, both individual wheel slips must be less than the collective threshold. Because this particular embodiment is set up such that a failure of any measured wheel slip to stay below its corresponding threshold (i.e., all conditions must be satisfied), the overall outcome of this evaluation would be that an excessive slip condition exists. As demonstrated in the example above, the individual wheel slip thresholds are generally higher than the collective wheel slip thresholds (e.g., 20% higher). This is because the method will tolerate slightly more wheel slip by a single wheel than it will for a wheel pair. In this example, both individual and collective wheel slips are compared against corresponding thresholds and are part of the evaluation. In other embodiments, step 106 may only evaluate individual wheel slip, only evaluate collective wheel slip, or evaluate some other combination of comparisons.

Another example is provided for a vehicle that is traveling at 70 m.p.h. when it encounters a small isolated pothole on the left side of the vehicle (this is why the wheel slip values for the left side are significantly higher than those of the right side). Because these values are based on a vehicle speed of 70 m.p.h., the various wheel slip thresholds are generally lower than in the preceding example which was based on 10 m.p.h. (usually less wheel slip is tolerated at higher speeds). This example is summarized in Table II, where none of the wheel slip conditions are satisfied (i.e., none of the measured wheel slip values exceed their corresponding wheel slip thresholds) and no excessive wheel slip condition is found. Unlike the example in Table I, the front and rear individual wheels in Table II have different wheel slip thresholds. It should be appreciated that the examples in Tables I and II are only meant to illustrate some of the potential ways in which individual and collective wheel slip may be evaluated, and that the present method is not limited to these specific evaluations nor is it limited to these exemplary values. If step 106 determines that no excessive wheel slip condition exists, then the method returns to step 102 for continued monitoring; if an excessive wheel slip condition does exist, then the method proceeds to the next step.

TABLE II

| | FL (3%) | FR (1%) | RL (3%) | RR (0%) | CF (3, 1%) | CR (3, 0%) | Wheel Slip Outcome |
|---|---|---|---|---|---|---|---|
| Front Individual Wheel Slip Threshold | 5% | 5% | | | | | False |
| Rear Individual Wheel Slip Threshold | | | 4% | 4% | | | False |
| Front Collective Wheel Slip Threshold | | | | | 4% | | False |
| Rear Collective Wheel Slip Threshold | | | | | | 4% | False |

Steps 108 and 110 are optional and are provided in order to avoidv cancelling the regenerative braking operations due to momentary excessive wheel slip conditions that do not threaten vehicle stability. Any type of counter and/or timer arrangement may be used, including the exemplary embodiment where an Excessive Wheel Slip counter is used to ensure that the excessive wheel slip condition exists for a certain number of method loops. The Excessive Wheel Slip counter may be incremented or decremented until it reaches some expiration in step 110. In one embodiment, the excessive wheel slip condition has to last for 5 method loops, which at an average of 7 mS per method loop results in about 35 mS, during which the excessive wheel slip condition must persist. If at any time the excessive wheel slip condition ceases to exist, then step 106 sends control of the method to step 112 where the Excessive Wheel Slip counter is reset and the method loops back to the beginning. If, however, the Excessive Wheel Slip counter does expire, then the method proceeds to step 114. As stated above, steps 108, 110 are optional and other techniques can be used to ensure that excessive slip is not momentarily.

Step 114 disengages regenerative braking operations, and may do so in a number of different ways. In an embodiment where the brakes are currently being applied (either manually by the driver or automatically by some device, module, system, etc.), step 114 may disengage the regenerative braking operation by having EBCM 30 or some other device send out appropriate command signals to regenerative braking system 34 and frictional braking system 32 that deactivate the regenerative braking while activating the frictional braking. It is possible for these command signals to cause a sudden deactivation and activation in the regenerative and frictional braking systems, respectively, or they can initiate a gradual disengagement of the regenerative braking operations. For instance, step 114 may disengage regenerative braking operations by progressively decreasing the amount of regenerative braking torque over a number of steps or method loops, as opposed to cancelling the regenerative braking operation in a single step. The progressive decrease in the amount of regenerative braking may be based on the magnitude and/or location (front to back, right to left, etc.) of the wheel slip, the magnitude of the braking intent or driver requested braking torque, and/or some other factor. It should be appreciated that method 100 is not limited to the particular way or technique that step 114 uses to disengage the regenerative braking operations or to blend the regenerative and frictional braking operations, as these techniques may already exist in the vehicle and be handled by some other algorithm. Skilled artisans will appreciate that any number of different methods and techniques could be used to determine the most optimal blend or combination of frictional and regenerative braking forces. It is also possible for EBCM 30 or some other device to provide the output of method 100 (i.e., the excessive wheel slip condition status) to other devices, modules and/or systems in the vehicle, such as an electronic stability control (ESC), a vehicle stability assist (VSA), a vehicle stability control (VSC), etc.

In an embodiment where the brakes are not currently being applied, step 114 may disengage the regenerative braking operations by setting a flag or initiating some other process that prevents regenerative braking in the near future. For example, if step 114 sets a flag to prevent regenerative braking because of an excessive wheel slip condition and the driver were to engage the brakes 1.0 second later (assuming the condition still exists), then regenerative braking system 34 may be prevented from operating so that all of the braking responsibilities are left up to the frictional braking system 32. This disengagement or prohibition against regenerative braking may continue until it is determined that the excessive wheel slip conditions no longer exists, at which point the flag could be reset.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. Also, it is not necessary that the present method by used with an electro-hydraulic braking (EHB) system, as it may be used with other braking systems like an electro-mechanical braking (EMB) system instead. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a vehicle brake system, comprising the steps of:
   (a) determining an individual wheel slip pertaining to a single vehicle wheel and a collective wheel slip pertaining to multiple vehicle wheels;
   (b) determining a vehicle speed;
   (c) using the vehicle speed to establish a first speed-based threshold for individual wheel slip and comparing the individual wheel slip to the first speed-based threshold, and using the vehicle speed to establish a second speed-based threshold for collective wheel slip and comparing the collective wheel slip to the second speed-based threshold, wherein the first speed-based threshold usually differs at different vehicle speeds, and the first and second speed-based threshold usually differ at the same vehicle speed; and (d) when the individual wheel slip exceeds the first speed-based threshold or the collective wheel slip exceeds the second speed-based threshold, then disengaging a regenerative braking operation.

2. The method of claim 1, wherein step (a) further comprises determining an individual wheel slip pertaining to a first vehicle wheel, an individual wheel slip pertaining to a second vehicle wheel, and a collective wheel slip pertaining to the first and second vehicle wheels.

3. The method of claim 2, wherein the first and second vehicle wheels are attached to the same axle of the vehicle so that the method evaluates collective wheel slip that pertains to side-to-side wheel slip.

4. The method of claim 2, wherein the first and second vehicle wheels are attached to the same side of the vehicle so that the method evaluates collective wheel slip that pertains to front-to-back wheel slip.

5. The method of claim 2, wherein step (c) further comprises comparing the individual wheel slips for both the first and second vehicle wheels to one or more individual speed-based thresholds for wheel slip, where at least one of the one or more individual speed-based thresholds is higher than the collective speed-based threshold for wheel slip.

6. The method of claim 1, wherein step (a) further comprises determining wheel slip over a period of time; and step (c) further comprises comparing the wheel slip to the first or the second speed-based threshold for wheel slip over a period of time so that momentary wheel slips do not necessarily result in a disengagement of the regenerative braking operations.

7. The method of claim 1, wherein step (d) further comprises disengaging the regenerative braking operation by progressively decreasing the amount of regenerative braking over a plurality of steps, as opposed to cancelling the regenerative braking operation in a single step.

8. The method of claim 7, wherein the progressive decrease in the amount of regenerative braking is based on a magnitude and/or location of the wheel slip, where the greater the amount of wheel slip the more aggressive the decrease in regenerative braking 9. A method for operating a vehicle brake system, comprising the steps of:

(a) determining a first wheel slip and a second wheel slip, wherein the first wheel slip is an individual wheel slip for a single vehicle wheel and the second wheel slip is a collective wheel slip for a plurality of vehicle wheels;

(b) comparing the first wheel slip to a first threshold and comparing the second wheel slip to a second threshold, wherein the first threshold is an individual threshold and the second threshold is a collective threshold and the first individual threshold is usually higher than the second collective threshold across a range of typical vehicle speeds; and (c) when either the first wheel slip exceeds the first threshold or the second wheel slip exceeds the second threshold, then disengaging a regenerative braking operation.

10. The method of claim 9, wherein at least one of the first and second thresholds is a speed-based threshold that is based on a vehicle speed.

11. The method of claim 9, wherein the plurality of vehicle wheels are attached to the same axle of the vehicle so that the method evaluates collective wheel slip that pertains to side-to-side wheel slip.

12. The method of claim 9, wherein the plurality of vehicle wheels are attached to the same side of the vehicle so that the method evaluates collective wheel slip that pertains to front-to-back wheel slip.

13. The method of claim 9, wherein step (a) further comprises determining the first and second wheel slips over a period of time; and step (c) further comprises comparing the first and second wheel slips to the first and second thresholds over a period of time so that momentary wheel slips do not necessarily result in a disengagement of the regenerative braking operations.

14. The method of claim 9, wherein step (d) further comprises disengaging the regenerative braking operation by progressively decreasing the amount of regenerative braking over a plurality of steps, as opposed to cancelling the regenerative braking operation in a single step.

15. The method of claim 14, wherein the progressive decrease in the amount of regenerative braking is based on a magnitude and/or location of the first or second wheel slip, where the greater the amount of wheel slip the more aggressive the decrease in regenerative braking.

* * * * *